Patented Jan. 9, 1945

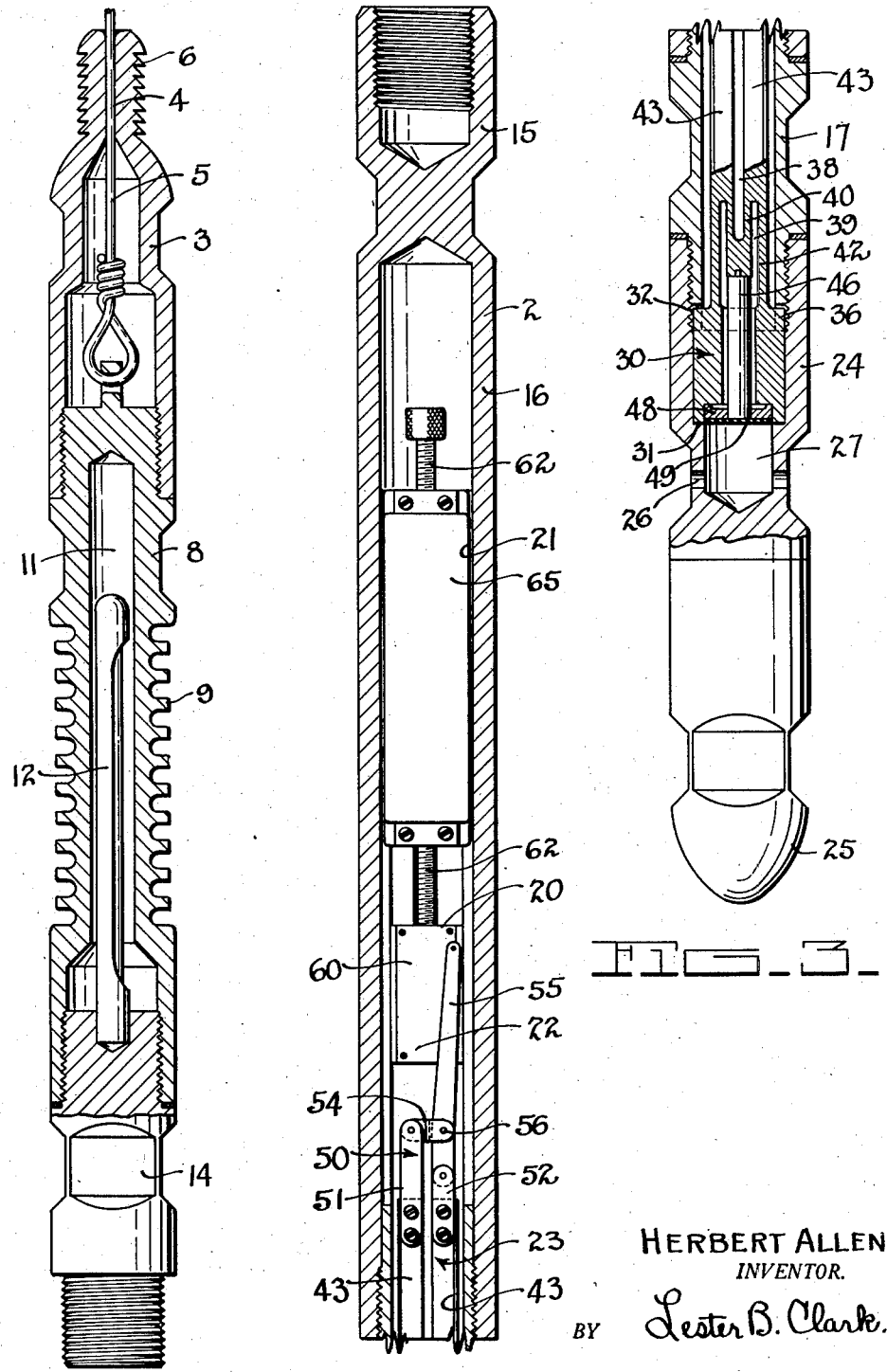

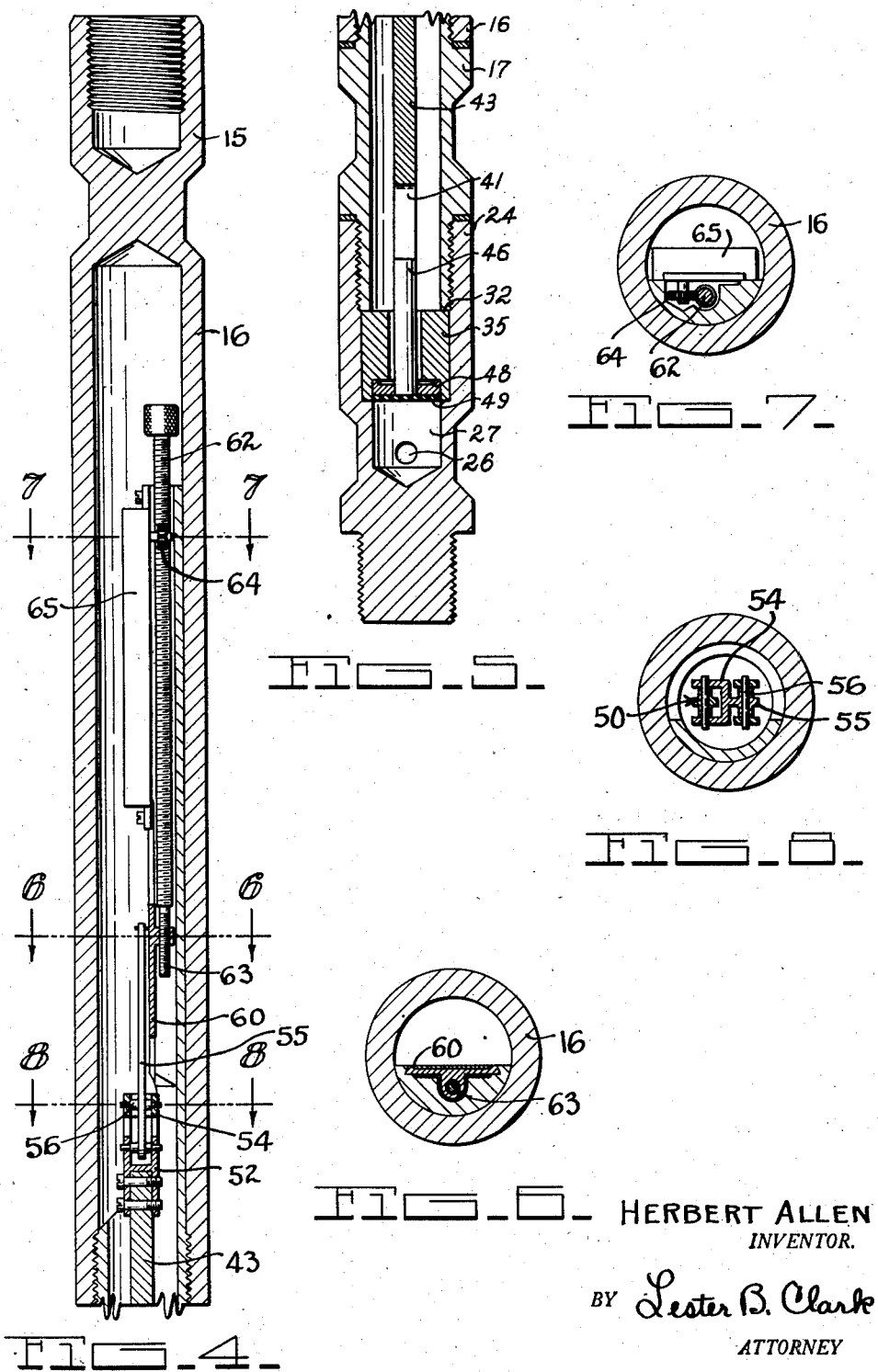

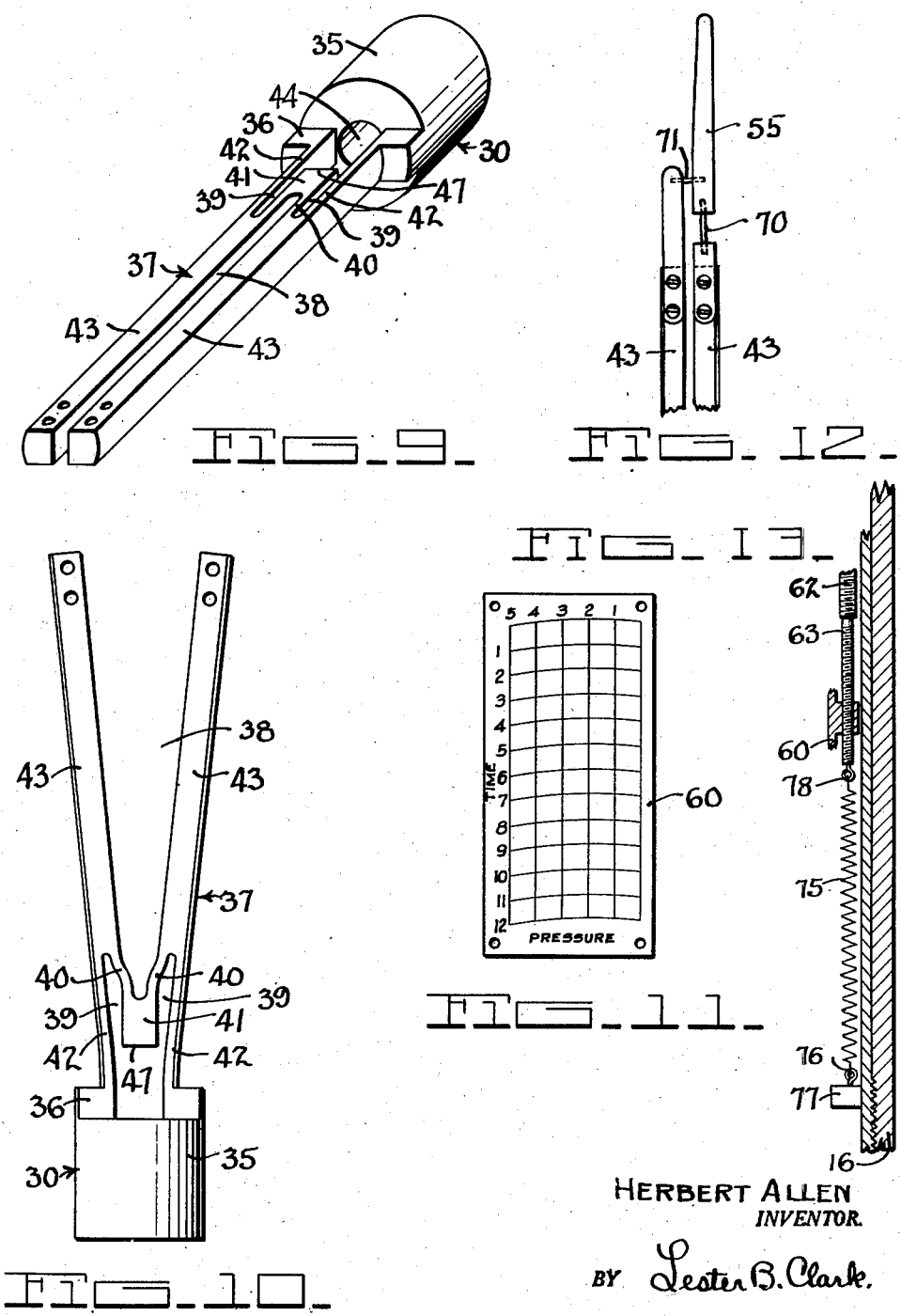

2,366,826

UNITED STATES PATENT OFFICE 2,366,826

BOTTOM HOLE PRESSURE RECORDER

Herbert Allen, Houston, Tex., assignor, by mesne assignments, to Cameron Iron Works, Inc.

Application December 26, 1940, Serial No. 371,699

3 Claims. (Cl. 73—300)

The invention relates to an improvement in bottom hole pressure recorder bombs.

In the drilling of wells by the rotary method, where the well is filled with drilling mud it is very essential that the operator ascertain the pressure which is existent in the hole at different depths. This pressure occurs due to the pressure in the formations which have been penetrated and also due to the pressure of the static column of mud or liquid in the well. It is, of course, desirable to maintain a predominant pressure on the formation due to the weight of the column of liquid in the hole so as to prevent the pressures from the formation blowing into the hole and destroying the well. The term "bottom hole" is merely relative and is used herein as applying to any depth below the top of the well bore or hole. The term "bomb" is used herein as descriptive of the device because that is the name applied to the device by the industry. The term "elastic system" is applied to a portion of the device where the movement of the parts due to the elastic characteristics of the parts is proportional to the force causing such movement.

On the other hand, it is desirable not to maintain too predominant a pressure because such excess might force an excess of the drilling mud or other liquid in the well into the formation. Too great a pressure on the formation might block off a productive formation or effect other undesirable results.

It is one of the objects of the present invention to provide a recording pressure recorder which can be lowered into and removed from the well bore so as to make a record of the pressure at the various depths as the device traverses the bore hole.

It is one of the objects of the invention to provide a simple and economic pressure recorder which will withstand the high pressures encountered in deep wells.

Another object of the invention is to provide a bottom hole pressure bomb which contains an elastic system to be actuated by the pressure occurring in the well bore.

It is also an object of the invention to provide a pressure bomb with a plurality of cooperating elastic systems to record the well pressure.

Still another object of the invention is to provide a bottom hole pressure responsive bomb with an elastic system having a pivoted linkage for operating the recorder device.

Another object of the invention is to provide a pressure recording arm to indicate upon a time recording chart the pressures occurring in a well bore.

It is also an object of the invention to provide a spring to actuate the recorder and to eliminate lost motion in the operation of the recording mechanism.

A still further object of the invention is to provide a combination temperature and pressure responsive bottom hole bomb.

Other and further objects of the invention will be readily apparent when the following description is considered in connection with the accompanying drawings wherein:

Fig. 1 is a side elevation with certain parts in section showing the temperature responsive portion of the bomb.

Fig. 2 is a continuation of the device of Fig. 1 and illustrates a housing and recording mechanism therein.

Fig. 3 is a continuation of the device of Figs. 1 and 2 and illustrates the arrangement of the pressure responsive structure in the bomb housing.

Fig. 4 is a vertical sectional view taken at right angles to the section of Figs. 1 and 2.

Fig. 5 is a continuation of the section of Fig. 4.

Figs. 6, 7 and 8 are sections taken on the corresponding sectional lines of Fig. 4.

Fig. 9 is a perspective view of the elastic system or spring.

Fig. 10 is a side elevation of the spring unit as it would appear when stressed to an exaggerated degree.

Fig. 11 is an illustration of the type of chart which is to have recorded thereon the time and pressure.

Fig. 12 is a broken detailed view of a modification of the leverage mechanism as shown in Fig. 2.

Fig. 13 is a broken detailed view of a spring actuated form of the recorder chart mechanism.

The bomb is arranged to be enclosed in a housing 2 which is made up of a number of parts, including the head 3 in Fig. 1. This head has an opening 4 therethrough to receive the wire line 5 by which the device is manipulated in the well bore. A grooved stem 6 is provided on the top of the head 3 to receive a suitable retrieving tool to remove the bomb from the well if the wire line 5 should be broken.

A section 8 is connected to the head and has a plurality of fins 9 thereon to facilitate the absorption or dissipation of heat so that this section 8 varies rapidly in temperature with the temperature occurring at various depths in the bore hole. A recess 11 in this section carries a thermometer 12 which may be of the recording type, or merely of a type to show the minimum and maximum temperatures encountered.

A coupling 14 is arranged to be connected into the upper end 15 of the pressure recorder containing casing 16. This casing is of any desired length and has a coupling 17 on the lower end thereof and is arranged to house the recording mechanism indicated generally at 20. This mechanism includes a timing device such as a clockwork 65, the recording chart 60 and the pressure gauge or device 23. The lower end of this casing 16 carries a coupling 17 which is closed by the base 24 which may have a rounded lower end 25.

A plurality of ports 26 open into the recess 27 in the base so that the pressure occurring in the well bore may be present in this recess 27.

The pressure responsive system 23 is disposed in the casing 16 and is arranged to include the elastic system or spring unit 30. This spring has its lower end seated upon a shoulder 31 and is clamped in place by the lower end 32 of the coupling 17.

This elastic system is best seen in Figs. 9 and 10 and includes a base 35 having the footing or cross beam 36 thereon which carries a body or member 37. This body is of a peculiar configuration in that it is in the form of a flat plate having a slot 38 extending inwardly from one end thereof and a pair of spaced slots 39 extending inwardly from the other end. These two slots overlap a short distance to provide short columns 40 which are joined at one end by the rigid portion 41. The slots 39 in turn define two outer columns or arms 42 which are joined to the beam 36 and merge with the short columns 40 into the arms 43.

The base 35 has an opening 44 therein which is arranged to receive a load pin or other pressure transmitting mechanism 46. This pin is seen in Fig. 3.

Figs. 3 and 5 show the means for transmitting the pressure from the opening 26 to the spring member 30 which means comprises an elastic system made up of a disc or plate 48 which fits around the load pin 46 but is in no way connected thereto and is arranged to flex as the load pin moves so as to eliminate relative movement of the plate and pin and to avoid friction losses. This plate 48 and the pin 46 will have the same unit area pressure applied to them by the pressure being gauged. The plate is constructed as disclosed in my copending application hereinafter mentioned so that it will flex due to pressure and move in unison with the pin so that there is no friction loss or relative movement to introduce error. A protective covering 49 is deposited over the plate 48 to avoid corrosion and leakage.

The spring 30 will flex as a function of the pressure applied to it and permit corresponding movement of the pin 46 and the plate 48. Thus, the two elastic systems comprising the spring device 30 as one system and the pin 46 and plate 48 as the other system will flex as a unit.

With this construction the pressure effects a movement of the lower end 47 of the rigid portion 41, and inasmuch as the columns 42 are affixed to the beam 36, it seems clear that any pressure exerted by this load device will impart compression to the columns 40 and tension to the columns 42.

Fig. 10 shows an illustrative arrangement of the flexing of the columns 42 when the columns 40 are loaded in compression. Fig. 10 illustrates that the arms 43 have moved apart and this spreading or flexing action of the elastic system is a function of the pressure which is applied. By suitably calibrating the device, the applied pressure can be readily determined. This stress unit is illustrated in my copending application, Serial No. 367,160 filed November 26, 1940, for a pressure gauge.

Fig. 2 shows a leverage mechanism 50 by which the movement of the arms 43 may be determined. This mechanism includes a bar 51 affixed to one of the arms 43 and a shorter bar 52 affixed to the other arm 43. The bar 51, in turn, has a link 54 pivoted thereon and the bar 52 has an arm 55 pivoted thereto, while an additional pivot 56 connects the link 54 with the arm 55. With this mechanism it seems obvious that when the arms 43 move apart the link 54 and arm 55 just described will be caused to pivot so as to move the recording element on arm 55 in a horizontal arc.

In order to record the variation in the position of the arm 55 as an indication of the variation in pressure occurring in the well bore where the device is operating, a chart 60 is positioned in the casing 16. This chart is arranged to be positioned in front of the recording arm 55, and one form of the chart is shown in Fig. 11. This chart is calibrated so that the abscissae will indicate the pressure and the ordinates will indicate the variation in time.

In order to move the chart 60 in a vertical direction in accordance with the lapse of time, a spindle 62 is positioned inside of the casing 16. This spindle has a threaded area 63 for connection to the chart 60 and the spindle, in turn, is arranged to receive vertical movement by means of a pinion 64 operated by a timing mechanism, such as a clock clockwork 65.

In this manner, by adjustment of the spindle 62, the chart can be arranged to travel vertically for an interval of time during which the device is to be operated into and out of the well bore. The operator can obviously keep a record of the depth of the device at different time intervals so as to correlate the information from the chart 60 with the depth at which the device was present during different time intervals.

Fig. 12 shows a slightly modified form of the leverage mechanism wherein an elastic system has been included wherein the arms 43 are of different length and wherein the pivot pins are omitted so as to avoid friction losses. In this construction a flexible support 70 is used to connect one arm 43 and the recorder arm 55. A somewhat similar flexible member 71 is used to connect the other arm 43 directly with the recorder arm 55. The functioning of this modification is the same as that of Fig. 2, so that in all there may be three elastic systems in cooperation in the operation of the device.

Fig. 13 shows a modified form of the power source for the chart 60 in that a spring 75 has one end 76 anchored at 77 to the housing 16 and the other end 78 connected to the lower end of the spindle 62, 63. This spring serves the dual purpose of exerting a pull on the spindle so that only an escapement device would need to be connected to the pinion 64 to control its rate of turning on the one hand and to take up any lost motion in the parts on the other hand.

Broadly, the invention contemplates a simple, accurate and economical temperature and pressure responsive recorder bomb for wells which is operated by a plurality of elastic systems.

What is claimed is:

1. In a load responsive device, an elastic system including two relatively movable parts, means for loading said system to cause said parts to move relative to each other, an indicator comprising an arm and a pair of flexible connectors extending at substantially right angles to each other and each having one end fixed to one of said relatively movable parts, the other end of each of said connectors being fixed at spaced points along the length of said arm, whereby said arm will be caused to rotate about an intermediate point of its length upon relative movement of said relatively movable parts to indicate the load being applied to said elastic system.

2. In a load responsive device, an elastic system having a pair of parts relatively movable when said system is loaded, an indicator arm, and a pair of resilient connectors disposed at substantially right angles to each other and each having one end rigidly secured to one of said relatively movable parts and the other ends of said connectors being rigidly secured to said arm at spaced points thereon, whereby upon relative movement of said parts under load on said system said connectors will flex and said arm will rotate to indicate the amount of such load.

3. In a load responsive device, an elastic system including two parts having relatively movable substantially parallel end portions one of which projects beyond the other, means for loading said system to cause said end portions to move toward or away from each other, a flexible connector carried by the shorter end portion and projecting therefrom in a direction substantially parallel to the longer end portion, an indicator arm secured to the opposite end of said flexible connector and projecting in substantially the same direction as said flexible connector, and a second connector connecting the longer end portion with an intermediate point on said indicator arm whereby when said end members are moved toward or from each other said indicator arm will be caused to swing through an arc indicating the extent of such movement.

HERBERT ALLEN.